United States Patent
Schoop

(10) Patent No.: US 6,513,820 B2
(45) Date of Patent: Feb. 4, 2003

(54) AIR SPRING SYSTEM FOR A TWO AXLE MOTOR VEHICLE

(75) Inventor: Reimar Schoop, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/739,628

(22) Filed: Dec. 20, 2000

(65) Prior Publication Data

US 2001/0015538 A1 Aug. 23, 2001

(30) Foreign Application Priority Data

Feb. 18, 2000 (DE) .......................................... 100 07 382

(51) Int. Cl.[7] ................................................. B60G 9/04
(52) U.S. Cl. ........................... 280/124.157; 280/124.16; 280/6.159
(58) Field of Search ..................... 280/124.157, 124.16, 280/124.161, 6.157, 6.159

(56) References Cited

U.S. PATENT DOCUMENTS

| | | | | |
|---|---|---|---|---|
| 4,462,610 A | * | 7/1984 | Saito et al. ............ | 280/124.157 |
| 4,518,169 A | * | 5/1985 | Kuroki et al. ..... | 280/124.157 X |
| 4,648,621 A | * | 3/1987 | Yokoya et al. ..... | 280/124.157 X |
| 4,695,074 A | * | 9/1987 | Kobayashi et al. ... | 280/124.157 |
| 4,696,483 A | * | 9/1987 | Takizawa et al. ... | 280/124.16 X |
| 4,756,548 A | * | 7/1988 | Kaltenthaler et al. . | 280/124.16 X |
| 4,783,089 A | * | 11/1988 | Hamilton et al. ... | 280/124.16 X |
| 4,881,753 A | * | 11/1989 | Shima et al. ..... | 280/124.157 X |
| 5,344,189 A | * | 9/1994 | Tanaka et al. ..... | 280/124.157 X |
| 5,466,007 A | * | 11/1995 | Smith ............... | 280/124.157 X |
| 5,697,635 A | * | 12/1997 | Koster et al. ......... | 280/124.157 |
| 5,975,508 A | * | 11/1999 | Bread .................... | 280/124.16 |
| 6,173,974 B1 | * | 1/2001 | Raad et al. ............. | 280/6.157 |
| 6,189,903 B1 | * | 2/2001 | Bloxham ............. | 280/124.157 |

FOREIGN PATENT DOCUMENTS

| EP | 0 791 492 | 8/1997 |
|---|---|---|
| EP | 0 803 385 | 10/1997 |

* cited by examiner

*Primary Examiner*—Peter C. English
*Assistant Examiner*—Toan To
(74) *Attorney, Agent, or Firm*—Crowell & Moring LLP

(57) ABSTRACT

An air spring system for a two axle motor vehicle has a compressed air source and control valves. The control valves are assigned to the individual motor vehicle wheels and by means of which the respective vehicle wheel air springs can be connected by choice to a compressed air supply line which is connected to the compressed air source. The air springs of the vehicle front axle and the air springs of the vehicle rear axle have their own compressed air line branches, whose cross sections differ at least by segments; and the line branch of one of the two axles is designed in such a manner that its flow cross section during compressed air infeed into the assigned air springs differs at least by segments from the flow cross section during compressed air bleeding from the assigned air springs. Preferably that line branch, whose flow cross section during compressed air infeed differs from that during compressed air bleeding, comprises parallel connected subbranches with flow cross sections that differ at least by segments; and at least one of the subbranches exhibits a suitably arranged non-return valve, which releases this subbranch only in one direction of flow.

3 Claims, 2 Drawing Sheets

AIR SPRING SYSTEM FOR A TWO AXLE MOTOR VEHICLE

BACKGROUND AND SUMMARY OF THE INVENTION

This application claims the priority of German Patent Document 100 07 382.4, filed Feb. 18, 2000, the disclosure of which is expressly incorporated by reference herein.

The invention relates to an air spring system for a two axle motor vehicle with a compressed air source and control valves, which are assigned to the individual motor vehicle wheels and by means of which the respective vehicle wheel-air springs can be selectively connected to a compressed air supply line, connected to the compressed air source. Furthermore, the air springs of the vehicle front axle and those of the vehicle rear axle have their own compressed air line branches. For the technical environment reference is made to the European Patent Document EP 0 791 492 A1, as an example.

Air spring systems differ from solely mechanically suspended wheel suspensions owing to their higher flexibility or greater variability. Thus, in the case of a complete air spring system for a two or more axle motor vehicle the height of the vehicle body compared to the ground and thus the ground clearance of the motor vehicle can be varied. Usually so-called open air spring systems are used, where in the case of the vehicle body being lowered from a raised position, the air mass, to be bled from the air springs for said body, is bled over a so-called ventilation line into the atmosphere, i.e. into the environment. Since this lowering is supposed to take place within a relatively short period of time, the document cited in the introductory part of the specification proposes circumventing in a bypass the so-called control valves, which in themselves constitute a flow resistance, during the lowering procedure. To fill the individual motor vehicle wheel air springs, in contrast, the compressed air that is conveyed from the compressor and, in addition, is usually taken from a storage volume, is guided over or through these control valves.

Among other things, owing to the non-uniform distribution of the motor vehicle body weight, the so-called static air pressure in the air springs, assigned to the vehicle front axle, can differ from that of the rear axle air springs. If at this point both the air springs of the front axle of the motor vehicle and those of the vehicle rear axle are supposed to be filled with additional air, starting from a lowered vehicle body level, in order to convey the vehicle body into a raised level, the front axle air springs and the rear axle air springs were filled at different rates owing to the said pressure differential so that while the vehicle body was pumped up, so to speak, said vehicle body would be tilted relative to the horizontal line.

For example, the amount of static air pressure in the air springs of the rear axle would be higher than that of the front axle. Then, in lifting or pumping up the vehicle body, it would be tilted so as to fall off in the direction of the rear. The situation is the same when lowering the vehicle body as a result of a partial removal of air from the air springs, since then the rear air springs would be emptied due to the positive pressure gradient relative to the front air springs. In the extreme case the front air springs could even be filled with air from the rear air springs.

An object of the present invention is to provide a remedy for the problem described above.

The solution to this problem according to the invention is characterized by the fact that the flow cross section of the is compressed air line branch(es), which are assigned to the air springs of the vehicle front axle, differs at least by segments from that of the compressed air line branch(es), assigned to the air springs of the vehicle rear axle. Furthermore, the line branch of one of the two axles is designed in such a manner that its flow cross section during compressed air feed into the assigned air springs differs at least by segments from the flow cross section during compressed air bleeding from the assigned air springs.

An especially simple and, therefore, advantageous air spring system of the invention is obtained when that line branch, whose flow cross section during compressed air feed differs from that during compressed air bleeding, comprises parallel connected subbranches with flow cross sections that differ at least by segments; and at least one of the subbranches exhibits a suitably arranged non-return valve, which releases this subbranch only in one direction of flow.

The invention is explained in detail with the aid of two preferred embodiments, where reference is made explicitly to the fact that the invention is not restricted to these embodiments. Important are rather the features, which are disclosed in the patent claims and which are described in greater detail below.

Other objects, advantages and novel features of the present invention will become apparent from the following detailed description of the invention when considered in conjunction with the accompanying drawings.

DETAILED DESCRIPTION OF THE DRAWINGS

Figure 1:
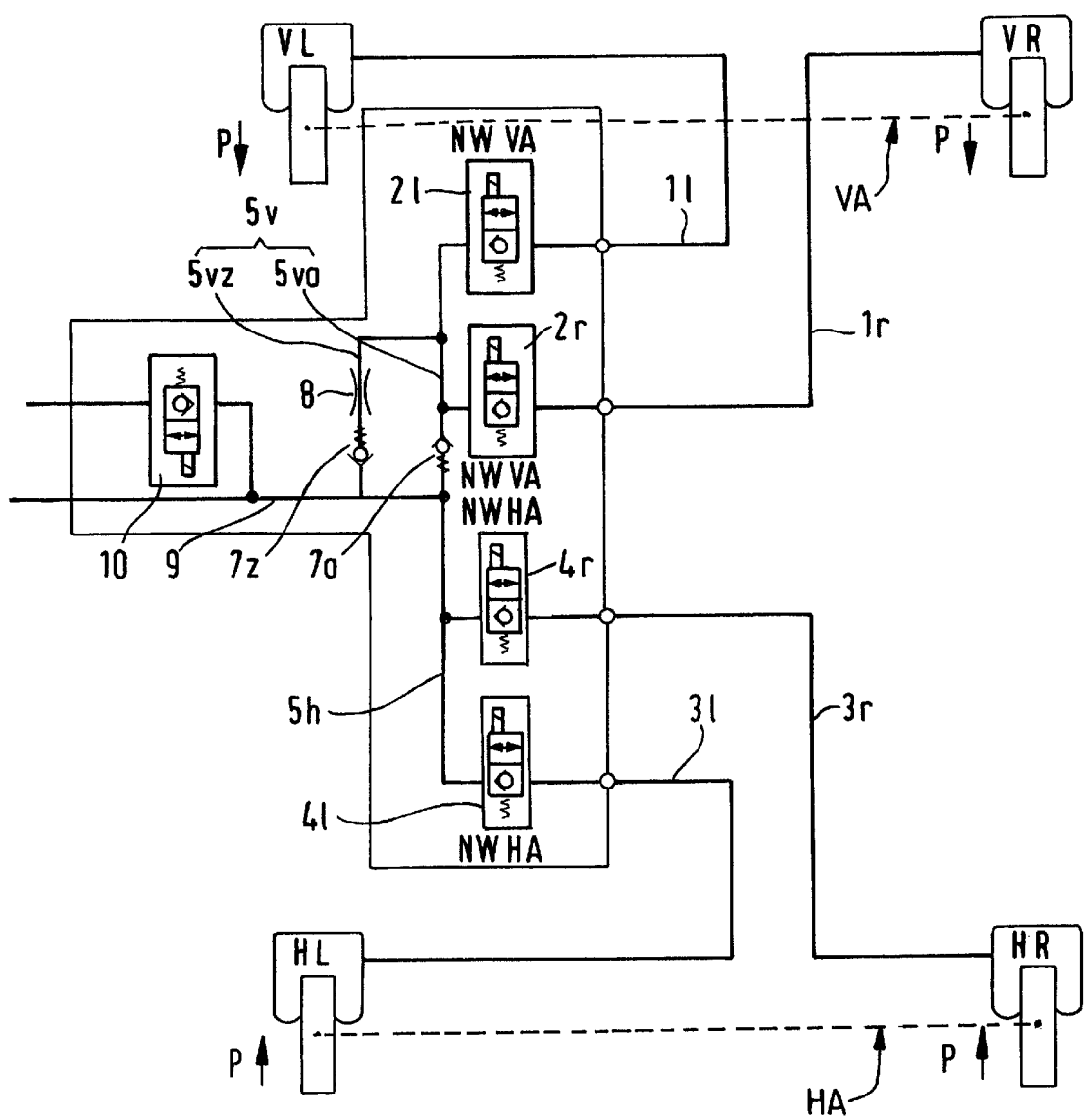
FIG. 1 is a schematic pneumatic circuit diagram of a vehicle air spring system constructed according to a preferred embodiment of the invention.

In both figures the sequence of letters VL denotes the air spring of the left front wheel; and the sequence of letters VR, that of the right front wheel of a four wheeled, two axle motor vehicle including schematically shows front axle VA and rear axle HA. The air spring VL can be supplied with compressed air over a compressed air line $1l$; and the air spring VR can be supplied with compressed air over a compressed air line $1r$ and in particular starting from a schematically illustrated compressed air source C and be filled or at least partially emptied. The compressed air line $1l$ has a control valve $2l$; and the compressed air line $1r$ has a control valve $2r$. On the other side of these control valves $2l$ and $2r$ the two compressed air lines $1l$ and $1r$ merge into a compressed air line branch $5v$.

The sequence of letters HL denotes the air spring of the left rear wheel; and the sequence of letters HR, that of the right rear wheel of the four wheeled, two axle motor vehicle. The air spring HL can be supplied with compressed air over a compressed air line $3l$; and the air spring HR, over a compressed air line $3r$ (also starting from the compressed air source C to which reference has already been briefly made). Thus, they can be filled or at least partially emptied. The compressed air line $3l$ has a control valve $4l$; and the compressed air line $3r$ has a control valve $4r$. On the other side of these control valves $4l$ and $4r$ the two compressed air lines $3l$ and $3r$ merge into a compressed air line branch $5h$.

The compressed air line branch $5v$, joined together for the front axle, comprises in turn again two pneumatically parallel connected subbranches $5vz$ and $5va$. In the embodiment according to FIG. 1, the subbranch 5va exhibits a non-return valve 7a, which blocks in the direction of the control valves 2l, 2r. In addition to a non-return valve 7z, which releases in the direction of the control valves 2l, 2r and thus blocks in the counter direction, the subbranch 5vz exhibits a restrictor 8. In the embodiment according to FIG. 2, only the subbranch 5va exhibits a non-return valve 7a, which blocks in the direction of the control valves 2l, 2r, whereas the subbranch 5vz has only a restrictor 8. In both embodiments (i.e. in both figures) the two subbranches 5vz and 5va of the compressed air line branch 5v and the compressed air line branch 5h empty finally with their ends, facing away from the respective control valves 2l or 2r or 4l or 4r, into a compressed air supply line 9.

The compressed air supply line 9 exhibits a branch, which leads in essence directly to a schematically illustrated compressor unit CU, and a branch, which branches off from the former and leads over a so-called storage valve 10 to a storage volume SV. The storage volume SV together with the compressor unit CU form the aforementioned compressed air source C. However, their detailed construction is unimportant. Rather what is important is that a current of compressed air can be introduced over the compressed air supply line 9. When the control valves 2l, 2r, 4l, 4r are open, the individual air springs VL, VR, HL, HR can also be filled with said current of compressed air beyond a basic filling when the vehicle body, which is carried by these air springs VL, VR, HL, HR, is supposed to be lifted. If, in contrast, the (non-illustrated) vehicle body is supposed to be lowered starting from a raised position, a part of the air mass can be bled from the air springs VL, VR, HL, HR over the compressed air supply line 9 when the control valves 2l, 2r, 4l, 4r are open and when the storage valve 10 is closed. To this end, of course, a correspondingly low pressure level must prevail in the compressed air supply line 9. It is easy to produce said state in a manner that is not depicted, for example, through connection with the environment. If finally the height of the vehicle body is to remain unchanged, the control valves 2l, 2r, 4l, 4r are closed.

As depicted by the letter p followed by the ↑ or ↓ arrow, the pressure level in the air springs VL and VR, assigned to the vehicle front axle, is less than that in the air springs HL and HR, assigned to the vehicle rear axle. Furthermore, it is still important that the front axle-assigned compressed air line branch 5v or the adjoining compressed air lines 1l and 1r have at least by sections or segments a different flow cross section than the rear axle-assigned compressed air line branch 5h or the adjoining compressed air lines 3l and 3r. When converted, they are denoted here by different nominal widths in the control valves 2l, 2r, 4l, 4r, which are denoted by the sequence of letters "NW VA" for the front axle or "NW HA" for the vehicle rear axle. In this respect the nominal width "NW VA" is greater than the nominal width "NW HA".

At this point a desired lowering of the vehicle body starting from a raised position will be described. To this end, air must be withdrawn from all of the air springs VL, VR, HL, HR. Since the pressure p in the rear air springs HL, HR is higher than in the front air springs VL, VR, the rear air springs HL, HR were emptied in principle faster, i.e. within a shorter period of time, into the compressed air supply line 9 (and over this line finally into the surroundings) than the front air springs VL, VR. The consequence of this would be an inclined position of the vehicle body, namely falling off in the direction of the rear. To prevent this, the nominal width of the rear control valves 4r, 4l with the value "NW HA" is less than that of the front control valves 2l, 2r with the value "NW VA", a state that is equivalent to the flow cross section of the rear compressed air line branch 5h being less by segments than that of the front compressed air line branch 5v. On the basis of the different flow cross section or in conjunction therewith the different flow resistance (namely in the respective control valves), however, the front air springs VL, VR and the rear air springs HL, HR are emptied with the same intensity or the air mass is bled with the same intensity so that the vehicle body does not experience any tilt during the lowering procedure, but rather all four wheels (or all four air springs VL, VR, HL, HR) are lowered with the same intensity.

Figure 2:
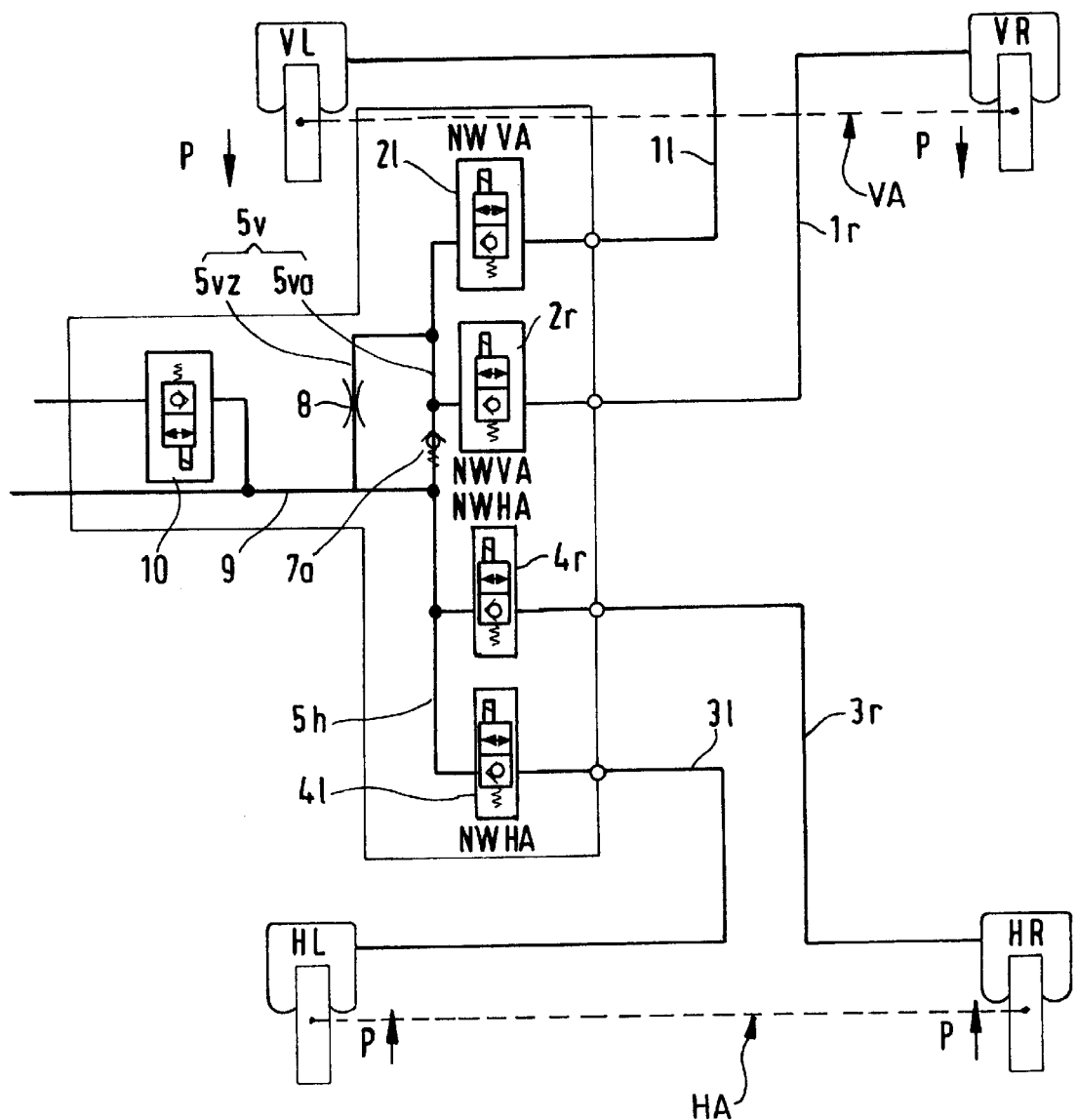
FIG. 2 is a view similar to FIG. 1, showing another preferred embodiment of the invention.

In the embodiment according to FIG. 1, air is bled from the front air springs VL and VR only over the subbranch 5va, which, unlike the subbranch 5vz, does not have an additional restrictor, since the non-return valve 7z blocks the subbranch 5vz when air is bled from the air springs VL and VR, whereas the non-return valve 7a releases the subbranch 5va when air is bled from the air springs VL and VR. Air feed to the front air springs VL and VR is possible only over the subbranch 5vz, containing the restrictor 8, due to the non-return valve 7a. The latter also applies to the embodiment according FIG. 2, where, however, air can be bled from the front air springs VL, VR over both subbranches 5va and 5vz, when there is no blocking non-return valve in the subbranch 5vz.

At this point a desired lifting of the vehicle body starting from the lowered position is described for both embodiments, i.e. for both figures combined. To this end, air must be fed into all of the air springs VL, VR, HL, HR. Since the pressure p in the rear air springs HL, HR is higher than in the front air springs VL, VR; and since—as explained above—the flow cross section in the rear compressed air line branch 5h (or in the rear control valves 4l, 4r with the nominal width "NW HA") is less than in the front compressed air line branch 5v (or in the front control valves 2l, 2r with the nominal width "NW VA"), the rear air springs HL, HR would be filled significantly more slowly, i.e. within a significantly longer period of time, than the front air springs VL, VR. The consequence would be an extreme tilted position of the vehicle body, namely falling off in the direction of the rear.

To prevent this, the subbranch 5vz, over which the front air springs VL, VR are filled, exhibits the aforementioned restrictor 8. This restrictor 8 is dimensioned in such a manner that the air mass, flowing only over the subbranch 5vz, which is released by the non-return valve 7z in filling the front air springs VL, VR, is throttled in such a manner and thus flows in such a throttled manner into the front air springs VL, VR that the vehicle body is lifted to the same degree in the front and the back. Thus, no inclined position of the vehicle body occurs. While the non-return valve 7z releases—as evident—the subbranch 5vz when air is fed into the air springs VL and VR, the non-return valve 7a blocks during this air feed the subbranch 5va, which does not contain any additional flow resistance.

When, in contrast, air is bled from all air springs VL, VR, HL, HR, the air in both embodiments is bled from the front axle air springs VL and VR over the then released subbranch 5va, which does not include a restrictor. In the embodiment according to FIG. 2, air can also be bled over the subbranch 5vz. However, owing to the released subbranch 5va, the restrictor 8 is not effective. The measures that are taken to avoid an inclined position of the vehicle body during the lowering procedure, namely the different nominal widths "NW–VA" and "NW–HA", have already been explained above. In this context reference is made explicitly to the fact that this detailed explanation is valid only when the pressure level in the rear axle air springs HR and HL is higher than that in the front axle air springs VL and VR. Under the reversed conditions, however, the subbranches 5va and 5vz can be provided in a corresponding manner to supply the rear axle air springs HL and HR. In this respect it is even possible to provide a switching mechanism, by means of which this subbranch 5va and 5vz with the throttling element 8 can be assigned optionally to the front axle or the rear axle of the motor vehicle.

From the above explanation it is clear that the air spring system of the invention guarantees in a simple manner that both in raising the vehicle body and in lowering the same the vehicle body cannot tilt, despite different pressure levels in the front air springs VL, VR and the rear air springs HL, HR. Rather the vehicle body is raised or lowered at least in essence uniformly at all air springs VL, VR, HL, HR.

What is important is that the flow cross section of the compressed air line branch 5v, assigned to the air springs VL, VR of the vehicle front axle, or the adjoining compressed air lines 1l and 1r differs, as described, at least by segments from that of the compressed air line branch 5h, assigned to the air springs HL, HR of the vehicle rear axle, or the adjoining compressed air lines 4r, 4l. The line branch of one of the two axles, here the line branch 5v, is designed in such a manner that its flow cross section during compressed air infeed into the assigned air springs VL, VR differs at least by segments from the flow cross section during compressed air bleeding from the assigned air springs VL, VR; and in particular in the manner disclosed. Of course, when the pressure level p in the front air springs VL, VR is higher than in the rear air springs HL, HR, the conditions (with respect to the respective flow cross sections) are reversed. Furthermore, it must also be pointed out that naturally a plurality of details, especially with respect to the construction, can be designed so as to deviate from the illustrated embodiment without leaving the content of the patent claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Air spring system for a vehicle having a front axle for front vehicle wheels and a rear axle for rear vehicle wheels, comprising:

front wheel air springs for each of the front vehicle wheels, rear wheel air springs for each of the rear vehicle wheels, a compressed air source, and an air control system operable to selectively supply compressed air to said front wheel and rear wheel air springs to raise the vehicle and to selectively exhaust compressed air from said front wheel and rear wheel air springs to lower the vehicle, said air control system including:
      a front air line branch communicating solely with the front wheel air springs, and
      a rear air line branch communicating solely with the rear wheel air springs, wherein one of said front and rear air line branches is configured to have a different flow cross section for air supplied from the compressed air source to wheel springs associated with the one of the front and rear air line branches than for air exhausted from the associated wheel air springs.

2. An air spring system according to claim 1, wherein said front and rear air line branches exhibit different flow cross sections for air supplied to and from their respective associated front and rear wheel air springs.

3. An air spring system according to claim 2, wherein the one of said air line branches configured to have different flow cross sections for air supplied than for air exhausted comprises parallel sub branches with flow cross sections that differ, and wherein at least one of the sub branches exhibits a non-return valve which releases this sub branch only in one direction of flow.

* * * * *